United States Patent [19]
Sato

[11] Patent Number: 6,101,042
[45] Date of Patent: Aug. 8, 2000

[54] ZOOM LENS

[75] Inventor: Haruo Sato, Kawaguchi, Japan

[73] Assignee: Nikon Corporation, Tokyo, Japan

[21] Appl. No.: 09/285,210

[22] Filed: Apr. 1, 1999

[30] Foreign Application Priority Data

Apr. 9, 1998 [JP] Japan .................................. 10-097972

[51] Int. Cl.$^7$ .................................................. G02B 15/14
[52] U.S. Cl. .......................... 359/684; 359/687; 359/690
[58] Field of Search .................................... 359/676, 684, 359/687, 689, 690

[56] References Cited

U.S. PATENT DOCUMENTS

| 5,583,701 | 12/1996 | Yamanashi | 359/683 |
| 5,694,253 | 12/1997 | Shibayama | 359/687 |
| 5,734,508 | 3/1998 | Sato | 359/687 |

*Primary Examiner*—Scott J. Sugarman
*Attorney, Agent, or Firm*—Vorys, Sater, Seymour & Pease, LLP

[57] ABSTRACT

To provide a zoom lens having wide field angle coverage, a zooming ratio of 3.5× or greater, and a large aperture such that F-number is on the order of F 2.8, a zoom lens is constituted having, in order from the object side thereof, a first lens group G1 having positive refractive power;

a second lens group G2 having negative refractive power;

and, at the image side thereof, one or more lens groups comprising a third lens group G3;

wherein an airspace between the aforesaid first lens group G1 and the aforesaid second lens group G2 changes during a change in magnification;

wherein the aforesaid second lens group G2 has, in order from the object side thereof, a negative lens component L1 comprising a negative lens presenting a concave surface toward the image side, a negative lens component L2 presenting a concave surface toward the object side, a positive lens component L3, a negative lens component L4, and a positive lens component L5;

and wherein the following conditional expression (1) is satisfied:

$$0 < n4-n5 < 0.4, \tag{1}$$

where:

n4=Refractive index at the d line of a negative lens within the aforesaid negative lens component L4, and n5=Refractive index at the d line of a positive lens within the aforesaid positive lens component L5.

20 Claims, 8 Drawing Sheets

ZOOM LENS

BACKGROUND OF THE INVENTION

The present invention pertains to a large-aperture, high-magnification [i.e., high-zooming-ratio] zoom lens.

There have heretofore been a great many proposals of zoom lenses having, in order from the object-most side, positive-negative power distributions, these including, for example, Japanese Laid-Open Patent Application (Kokai) No. S57[1982]-168209 and the like. Moreover, there have been a number of proposals of large-aperture, high-magnification [i.e., high-zooming-ratio] zoom lenses, these including, for example, Japanese Laid-Open Patent Application (Kokai) No. H4[1992]-208911 and Japanese [Laid-Open] Patent [Application (Kokai)] No. H4[1992]-208912. The zoom lenses disclosed in [these] Japanese Laid-Open Patent Applications have field angles of 62° and zooming ratios of approximately 3×, and have an F-number of F 2.8 at all focal lengths. Furthermore, a large-aperture zoom lens having a positive-negative-positive-positive-positive five-group constitution has been proposed at Japanese Laid-Open Patent Application (Kokai) No. H6[1994]-281862.

However, the aperture of the zoom lens disclosed at Japanese Laid-Open Patent Application (Kokai) No. S57[1982]-168209 is small, at [only] F 3.5 to F 4.5, and moreover, the field angle coverage thereof extends to only on the order of 62°. Furthermore, from the standpoint of aberrations as well, as there is incomplete correction of fluctuations in spherical aberration and astigmatism occurring as a result of zooming, and as some fluctuation in coma also remains, it would be difficult to achieve a large-aperture, wide-angle zoom lens having a field angle greater than 75° and [an aperture] on the order of F 2.8 with this optical system, given the constitution and distribution of refractive power therein [i.e., as disclosed]. Furthermore, while the large-aperture zoom lenses disclosed in Japanese Laid-Open Patent Application (Kokai) No. H4[1992]-208911 and Japanese Laid-Open Patent Application (Kokai) No. H4[1992]-208912, and in Japanese Laid-Open Patent Application (Kokai) No. H6[1994]-281862, attain satisfactory levels with respect to correction of aberration, and have large apertures, at F 2.8, as field angle at the wide-angle end is only on the order of 62°, and as zooming ratio is on the order of [only] 2.5× to 3×, further increases in field angle and in zooming ratio are desired.

The object of the present invention is therefore to solve the aforementioned problems and to provide a high-performance zoom lens having a wide field angle and a zooming ratio greater than 3.5×, and having a large aperture such that F-number is on the order of F 2.8.

SUMMARY OF THE INVENTION

To achieve the aforesaid object, the present invention constitutes a zoom lens such as the following.

A zoom lens having, in order from the object side thereof, a first lens group G1 having positive refractive power;

a second lens group G2 having negative refractive power;

and, at the image side thereof, one or more lens groups comprising a third lens group G3;

wherein an airspace between the aforesaid first lens group G1 and the aforesaid second lens group G2 changes during a change in magnification;

wherein the aforesaid second lens group G2 has five lens components separated by air spaces, said five lens components being in order from the object side thereof, a negative lens component L1 comprising a negative lens presenting a concave surface toward the image side, a negative lens component L2 presenting a concave surface toward the object side, a positive lens component L3, a negative lens component L4, and a positive lens component L5;

and wherein the following conditional expression (1) is satisfied:

$$0 < n4 - n5 < 0.4, \qquad (1)$$

where:

n4=Refractive index at the d line of a negative lens within the aforesaid negative lens component L4, and n5=Refractive index at the d line of a positive lens within the aforesaid positive lens component L5.

DETAILED DESCRIPTION OF PREFERRED EMBODIMENTS

Figure 1:
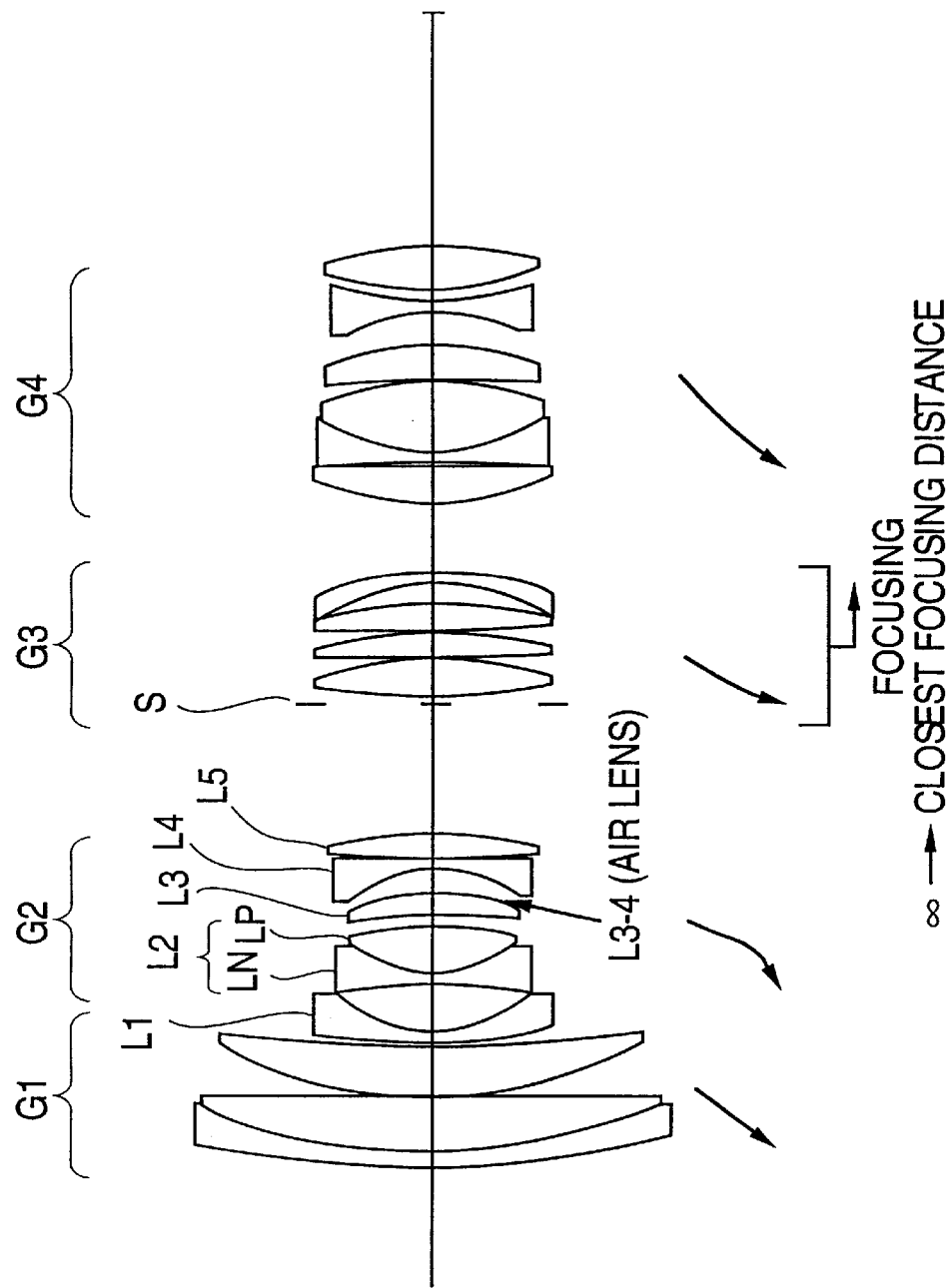
FIG. 1 is a drawing showing the constitution and locus of movement in Embodiment 1.

We begin with a description of the basic structure of the present invention.

To achieve increased zooming ratio magnification [range], increased field angle at the wide-angle end, and increased aperture size, methods have conventionally been employed wherein weakening of the overall refractive power of the second lens group G2 has been employed for satisfactory correction of particularly telephoto-end spherical aberration and coma, and satisfactory correction of wide-angle-end lower coma, astigmatism, and distortion.

In contrast thereto, the present invention, being a newly discovered type of lens having a constitution and distribution of refractive power among respective lens components hitherto unknown in a leading-convex-type zoom lens, permits simultaneous satisfaction of [the requirements for] large aperture, high zooming ratio, and wide field angle [in a package] that is small in size in relation to the specifications thereof, as a result of relative strengthening of the refractive power of the second lens group G2.

The second lens group G2 of the present invention comprises five lens components separated by air spaces, these lens components being, in order from the object side, negative, negative, positive, negative, and positive; in particular, the three lens components from the third to the fifth—these being positive, negative, and positive—are important elements for simultaneous satisfaction of [the requirements for] increasing aperture size, increasing zooming ratio, and increasing field angle.

First, located at the object-most side within the second lens group G2, negative lens component L1 and negative lens component L2 are concerned with correction of primarily wide-angle-side distortion, curvature of field, lower coma, and other such off-axial aberrations, while telephoto-side lower coma and spherical aberration are corrected for by the combination of positive lens component L3, negative lens component L4, and positive lens component L5.

Furthermore, to ensure that the surrounding airspaces [will be large enough] for zooming and to further satisfactorily correct for the various aberrations, the second lens group G2 in the present invention employs a retrofocus-type constitution and distribution of refractive power. Accordingly, the constitution from the third to the fifth lens component in the second lens group G2 may be thought of as a retrofocus-type lens in which the master lens portion thereof has been given a positive-negative-positive structure. Accordingly, primarily wide-angle-end-to-telephoto-end spherical aberration and lower coma can be corrected for by means of positive lens component L3 and negative lens component L4, and the air lens L3-4 [formed] therebetween, while primarily telephoto-side spherical aberration and other axial aberrations can be satisfactorily corrected for by giving positive lens component L5 an appropriate refractive power and shape.

Furthermore, to satisfactorily correct for curvature of field while strengthening the refractive power of the second lens group G2, it is necessary that an appropriate positive value be maintained for the Petzval sum of the overall system. It is therefore a both important and necessary condition—even more so than is the case with conventional zoom lenses—to employ a glass of high refractive index at the negative lens of the second lens group G2, and to employ at the positive lens(es) of the second lens group G2 a glass(es) having refractive index(ices) lower than that of the aforesaid negative lens of the second lens group G2.

What is important here is the relative magnitudes of the refractive indices of positive lens component L5 and negative lens component L4. For more satisfactory correction of spherical aberration, it is necessary that the refractive index n4 of [the] negative lens comprised by negative lens component L4 be greater than the refractive index n5 of [the] positive lens comprised by positive lens component L5. At this time, it is necessary that n4 and n5 satisfy conditional expression (1). This conditional expression (1) establishes conditions for simultaneously achieving correction of curvature of field and spherical aberration, it not being preferred that the value at conditional expression (1) exceed the upper limit thereof since if this were to happen the Petzval sum of the overall system would become markedly large and negative curvature of field would increase. Moreover, this is also not preferred because, since the refractive index of [the] positive lens comprised by positive lens component L5 would consequently become markedly small, this would result in strengthening [i.e., tightening] of the curvatures of the several lens surfaces, producing higher-order spherical aberration and making correction of particularly telephoto-side spherical aberration difficult. In addition, setting the upper limit of conditional expression (1) to 0.35 or less will permit attainment of even more satisfactory correction of curvature of field and spherical aberration. Furthermore, setting the upper limit of conditional expression (1) to 0.3 or less will permit maximum realization of the benefits of the present invention.

Moreover, it is not preferred that the value at conditional expression (1) fall below the lower limit thereof since if this were to happen the Petzval sum of the overall system would become markedly small and positive curvature of field would increase. In addition, setting the lower limit of conditional expression (1) to 0.005 or greater will permit attainment of even more satisfactory correction of curvature of field. Furthermore, setting the lower limit of conditional expression (1) to 0.01 or greater will permit maximum realization of the benefits of the present invention.

Next, it is desirable in the present invention that the following conditional expression (2) be satisfied:

$$0.06 < \Phi 5/|\Phi II| < 0.5, \quad (2)$$

where:

$\Phi II$=Overall refractive power of the aforesaid second lens group G2, and $\Phi 5$=Refractive power of the aforesaid positive lens component L5 within the second lens group G2.

This conditional expression (2) is for simultaneously achieving correction of spherical aberration and other aberrations and achieving simple manufacturing conditions.

If the value at conditional expression (2) were to exceed the upper limit thereof, this would cause the refractive power of positive lens component L5 to become markedly large, producing higher-order spherical aberration and consequently also causing the refractive power of negative lens component L4 to become markedly large, as a result of which satisfactory correction of coma and spherical aberration would be difficult. Furthermore, even if the various aberrations could be corrected such that they fell within allowed ranges, this would [still] not be preferred because it would make the refractive powers of the respective lens elements extremely strong, markedly reducing tolerances for decentration and making manufacturing difficult. In addition, setting the upper limit of conditional expression (2) to 0.4 or less will permit attainment of even more satisfactory correction of aberration and simpler manufacturing conditions. Furthermore, setting the upper limit of conditional expression (2) to 0.3 or less will permit maximum realization of the benefits of the present invention.

Moreover, it is not preferred that the value at conditional expression (2) fall below the lower limit thereof since if this were to happen the refractive power of positive lens component L5 would become markedly small, making appropriate setting of the Petzval sum of the overall system impossible amidst [the resulting] markedly diminished corrective effect with respect to spherical aberration and other aberrations. In addition, setting the lower limit of conditional expression (2) to 0.09 or greater will permit attainment of an even more appropriate Petzval sum setting and even more satisfactory correction of spherical aberration. Furthermore, setting the lower limit of conditional expression (2) to 0.1 or greater will permit maximum realization of the benefits of the present invention.

Next, it is desirable in the present invention that the following conditional expression (3) be satisfied:

$$-5 < (rb + ra)/(rb - ra) < 0.5, \quad (3)$$

where:

ra=Radius of curvature of the object-side surface of the aforesaid positive lens component L5 within the second lens group G2, and rb=Radius of curvature of the image-side surface of the aforesaid positive lens component L5.

This conditional expression (3) establishes conditions for appropriate setting of shape parameter(s) at L5 for more satisfactory correction of spherical aberration, [and] for increasing aperture.

If the value at conditional expression (3) were to exceed the upper limit thereof, this would cause the shape of positive lens component L5 to go beyond biconvex and approach a planoconvex shape presenting a convex surface toward the object side. As a result, the angle of refraction for an axial ray at the object-side surface, which determines F-number, would become markedly large, producing higher-order spherical aberration and making satisfactory correction of spherical aberration difficult. Furthermore, even if the various aberrations could be corrected such that they fell within allowed ranges, this would [still] not be preferred because it would make the refractive powers of the respective lens elements extremely strong, markedly reducing tolerances for decentration and making manufacturing difficult. In addition, setting the upper limit of conditional expression (3) to 0 or less will permit attainment of even more satisfactory correction of spherical aberration and simpler manufacturing conditions. Furthermore, setting the upper limit of conditional expression (3) to −0.15 or less, or further to −0.3 or less, will permit maximum realization of the benefits of the present invention.

Moreover, it is not preferred that the value at conditional expression (3) fall below the lower limit thereof, since if this were to happen, positive lens component L5 would be in the shape of a strongly positive meniscus presenting a convex surface toward the image side, as a result of which the angle of refraction for an axial ray at the image-side surface, which determines F-number, would become markedly large, producing higher-order spherical aberration. Moreover, this is also not preferred because it would become difficult to ensure that the space between the first lens group and the second lens group [will be large enough]. In addition, setting the lower limit of conditional expression (3) to −2 or greater will permit attainment of even more satisfactory correction of spherical aberration. Furthermore, setting the lower limit of conditional expression (3) to −1 or greater will permit maximum realization of the benefits of the present invention.

Next, it is desirable in the present invention that the following conditional expression (4) be satisfied:

$$0.05 < \Phi 3\text{-}4/\Phi II < 0.5, \qquad (4)$$

where:

$\Phi 3\text{-}4$=Refractive power of an air lens L3-4 formed by an airspace between the aforesaid positive lens component L3 within the second lens group G2 and the aforesaid negative lens component L4 within the second lens group [G2], and $\Phi II$=Overall refractive power of the aforesaid second lens group G2.

At this time, air lens refractive power $\Phi 3\text{-}4$ refers to the combined refractive powers of the image-most surface of the aforesaid positive lens component L3 within the second lens group G2 and of the object-most surface of the aforesaid negative lens component L4 within the second lens group [G2], which is located across the air gap from L3.

This conditional expression (4) establishes conditions for appropriate setting of the refractive power $\Phi 3\text{-}4$ of the air lens L3-4 formed by the airspace between the aforesaid positive lens component L3 within the second lens group G2 and the negative lens component L4 within the second lens group [G2], for simultaneously achieving correction of the various aberrations, particularly wide-angle-side lower coma, and simple manufacturing conditions. That is, in the present invention, when the convexly shaped space formed by the airspace from the image-most surface of positive lens component L3 within the second lens group G2 to the object-most surface of negative lens component L4 is viewed as an air lens L3-4, this air lens L3-4 can be thought of as having a large corrective effect on particularly telephoto-side spherical aberration and on wide-angle-side lower coma, astigmatism, and so forth.

Accordingly, if the value at conditional expression (4) were to exceed the upper limit thereof, this would cause the refractive power of air lens L3-4 to become markedly large, producing higher-order spherical aberration and consequently also causing the refractive powers of negative lens [component] L4 and positive lens component L5 to become markedly large, making satisfactory correction of particularly wide-angle-side lower coma and astigmatism difficult. Furthermore, even if the various aberrations could be corrected such that they fell within allowed ranges, this would [still] not be preferred because it would make the refractive powers of the respective lens elements extremely strong, markedly reducing tolerances for decentration and making manufacturing difficult. In addition, setting the upper limit of conditional expression (4) to 0.4 or less will permit attainment of even more satisfactory correction of aberration and simpler manufacturing conditions. Furthermore, setting the upper limit of conditional expression (4) to 0.3 or less will permit maximum realization of the benefits of the present invention.

Moreover, it is not preferred that the value at conditional expression (4) fall below the lower limit thereof since this would cause the radius of curvature of the image-side surface of positive lens component L3 and the radius of curvature of the object-side surface of negative lens component L4—i.e., the radii of curvature of the two surfaces of air lens L3-4—to approach each other in size. Furthermore, in the event that the absolute values of these radii of curvature are large, this will not be preferred because there will be a marked reduction in corrective effect with respect to spherical aberration and other aberrations. Moreover, in the event that the absolute values of these radii of curvature are small, this will not be preferred because there will be marked production of particularly telephoto-side spherical aberration and of wide-angle-side lower-coma higher-order aberration components, making satisfactory correction of aberration difficult. In addition, setting the lower limit of conditional expression (4) to 0.1 or greater will permit attainment of even more satisfactory correction of spherical aberration. Furthermore, setting the lower limit of conditional expression (4) to 0.2 or greater will permit maximum realization of the benefits of the present invention.

Next, to even more satisfactorily correct for spherical aberration and lower coma, it is desirable in the present invention that the aforesaid air lens L3-4 be in the shape of a positive meniscus presenting a convex surface toward the image side.

Next, to prevent marked increases in the angles of refraction for an axial ray at the respective surfaces, which determine F-number, and to consequently satisfactorily correct for off-axial aberrations while maintaining satisfactory correction of spherical aberration, it is desirable in the present invention that the aforesaid negative lens component L4 be in the shape of a negative meniscus presenting a convex surface toward the image side.

Next, it is desirable in the present invention that the following conditional expression (5) be satisfied:

$$1.5<(n3+n5)/2<1.8, \quad (5)$$

where:
- n3=Refractive index at the d line of a positive lens comprised by the aforesaid positive lens component L3 within the second lens group G2, and
- n5=Refractive index at the d line of a positive lens comprised by the aforesaid positive lens component L5 within the second lens group G2.

This conditional expression (5) establishes conditions for appropriate setting of the refractive indices of convex lens components comprised by positive lens component L3 and positive lens component L5 within the second lens group G2 for appropriate correction of curvature of field. Because in the present invention the second lens group is imparted with relatively strong negative refractive power, as has been described above, it becomes necessary to see that an adequately positive value is maintained for the Petzval sum of the overall system. For this reason, it will be necessary—even more so than is the case with conventional zoom lenses—to employ glass of relatively low refractive index at the positive lens(es) within the second lens group G2.

It is not preferred that the value at conditional expression (5) exceed the upper limit thereof since if this were to happen it would become difficult to ensure an optimum Petzval sum for the overall system, causing deterioration in curvature of field and astigmatism. In addition, setting the upper limit of conditional expression (5) to 1.77 or less will permit setting of an even more appropriate Petzval sum for the overall system, and moreover, setting the upper limit of conditional expression (5) to 1.76 or less will permit maximum realization of the benefits of the present invention.

Moreover, it is not preferred that the value at conditional expression (5) fall below the lower limit thereof since if this were to happen the refractive indices of the respective positive lens components would become markedly small, making [it necessary that] the radii of curvature of the respective surfaces assume small values and producing higher-order spherical aberration. In addition, setting the lower limit of conditional expression (5) to 1.55 or greater will permit attainment of even more satisfactory correction of aberration. Furthermore, setting the lower limit of conditional expression (5) to 1.6 or greater will permit maximum realization of the benefits of the present invention.

Next, for more satisfactory correction of spherical aberration and lower coma, and for appropriate setting of the Petzval sum of the overall system, it is desirable in the present invention that negative lens component L2 within the second lens group G2 have a cemented negative lens comprising a positive lens LP and a negative lens LN that have been cemented together. Moreover and in conjunction with the foregoing, it is desirable that the following conditional expression (6) be satisfied:

$$0.05<nN-nP<0.3, \quad (6)$$

where:
- nP=Refractive index at the d line of a positive lens LP comprised by the aforesaid cemented negative lens, and
- nN=Refractive index at the d line of a negative lens LN comprised by the aforesaid cemented negative lens.

This conditional expression (6) establishes conditions for simultaneously correcting for curvature of field and reducing differences in correction of the various aberrations as functions of wavelength.

If the value at conditional expression (6) were to exceed the upper limit thereof it would be possible to maintain an appropriate positive value for the Petzval sum of the overall system since there would be a marked difference in the refractive indices of positive lens LP and negative lens LN. However, this is not preferred because it would cause the radius(ii) of curvature of the cemented surfaces [i.e., interface] to become too small, increasing differences in correction of coma as a function of color (wavelength of light), chromatic difference of magnification, and differences in correction of spherical aberration as a function of color (wavelength of light). In addition, setting the upper limit of conditional expression (6) to 0.25 or less will make it possible to more satisfactorily correct for the aforementioned aberrations, and moreover, setting the upper limit of conditional expression (6) to 0.2 or less will permit maximum realization of the benefits of the present invention.

Moreover, it is not preferred that the value [at] conditional expression (6) fall below the lower limit thereof since if this were to happen the difference in the refractive indices of positive lens LP and negative lens LN would become markedly small, making it difficult to maintain an appropriate positive value for the Petzval sum of the overall system and causing deterioration in curvature of field and astigmatism. Moreover, this is also not preferred because it would cause deterioration in spherical aberration, coma, and other aberrations. In addition, setting the lower limit of conditional expression (6) to 0.1 or greater will permit setting of an even more appropriate Petzval sum for the overall system, and moreover, setting the lower limit of conditional expression (6) to 0.12 or greater will permit maximum realization of the benefits of the present invention.

Furthermore, employment of a biconcave lens shape at the aforesaid negative lens LN, because it permits attainment of gentler radii of curvature at the cemented surfaces [i.e., interface] of positive lens LP and negative lens LN while still allowing an appropriate positive value to be maintained for the Petzval sum of the overall system, will make it possible to further reduce differences in correction due to differences in the various aberrations as functions of wavelength, permitting maximum realization of the benefits of the present invention.

Next, to satisfactorily correct for particularly lower coma and coma fluctuations occurring during zooming, and for astigmatism, it is desirable in the present invention that a negative lens within negative lens component L4 within the second lens group G2 present a concave surface toward the object side and that this object-side concave surface be aspheric in shape such that curvature grows weaker as one goes from the center to the periphery thereof.

Next, to minimize fluctuation in aberration accompanying [changes in] focusing for spherical aberration, coma, and astigmatism, occurring during [changes in] focusing from the infinite-distance side to an object point at a short distance, it is desirable in the present invention that focusing be accomplished as a result of movement of the second lens group G2 toward the object, or that focusing be accomplished as a result of movement of the third lens group G3 toward the image plane, or that focusing be accomplished as a result of combination of both movement of the second lens group G2 toward the object simultaneous with movement of the third lens group G3 toward the image plane. Moreover, carrying out focusing by causing the second lens group G2 and the third lens group G3 to move by respectively different amounts of relative travel will permit maximum realization of the benefits of the present invention.

EMBODIMENTS

Below, we describe embodiments of the present invention.

Embodiment 1

FIG. 1 shows the constitution and locus of movement in Embodiment 1.

Embodiment 1 employs a four-group constitution wherein there are, in order from the object side thereof, a first lens group G1 having positive refractive power, a second lens group G2 having negative refractive power, a third lens group G3 having positive refractive power, and a fourth lens group G4 having positive refractive power.

The first lens group G1 consists of, from the object side thereof, a cemented positive lens comprising a negative meniscus lens presenting a convex surface toward the object side and a positive meniscus lens that have been cemented together, and a positive meniscus lens presenting a convex surface toward the object side.

The second lens group G2 consists of, in order from the object side thereof, an aspheric negative meniscus lens L1 presenting a convex surface toward the object side and having an aspheric surface at the object side thereof, a cemented negative meniscus lens L2 presenting a concave surface toward the object side and comprising a biconcave lens LN presenting a concave surface toward the object side [sic] and a biconvex lens LP that have been cemented together, a positive meniscus lens L3 presenting a convex surface toward the image side, an aspheric negative meniscus lens L4 presenting a concave surface toward the object side and having an aspheric surface at the object side thereof, and a biconvex lens L5.

Furthermore, an aperture stop S is installed immediately in front of the third lens group G3, and the third lens group G3 consists of three biconvex lenses and a negative meniscus lens presenting a convex surface toward the image side.

The fourth lens group G4 consists of a positive meniscus lens presenting a convex surface toward the object side, a cemented positive lens comprising a biconcave lens and a biconvex lens that have been cemented together, a positive meniscus lens presenting a concave surface toward the object side, a biconcave lens, and an aspheric biconvex lens having an aspheric surface at the object side thereof.

Zooming is accomplished such that in going from the wide-angle end toward the telephoto end, the several groups are respectively made to move toward the object in such fashion as to cause the airspace between the first lens group G1 and the second lens group G2 to grow larger, the airspace between the second lens group G2 and the third lens group G3 to grow smaller, and the airspace between the third lens group G3 and the fourth lens group G4 to first grow smaller and to thereafter grow somewhat larger.

Furthermore, [changing to] short-distance focusing is accomplished by moving the third lens group G3 toward the image. Moreover, it is possible to almost completely eliminate fluctuations in aberration resulting from [a change to] short-distance focusing if focusing is carried out by determining the amount of travel of the second lens group G2 that will just correct for fluctuation in curvature of field at each focal length and causing [the second lens group G2] to move toward the object by an amount corresponding thereto simultaneous with movement of the third lens group G3 toward the image during [the change to] short-distance focusing.

Data values for Embodiment 1 are presented below. Note that f indicates focal length, F NO indicates F-number, 2ω indicates field angle, and Bf indicates back-focus [distance].

Furthermore, aspheric surfaces indicated in the data tables are given by the following aspheric formula:

$$S(y) = (y^2/R) / \{1 + (1 - \kappa \cdot y^2/R^2)^{0.5}\} + C2 \cdot y^2 + C3 \cdot |y^3| + C4 \cdot y^4 + C5 \cdot |y^5| + C6 \cdot y^6 + C7 \cdot |y^7| + C8 \cdot y^8 + C10 \cdot y^{10} + C12 \cdot y^{12}$$

where S(y) is distance along the optical axis from a plane tangent to the vertex of [the] aspheric surface at height y from the optical axis in a direction perpendicular thereto, R is the reference radius of curvature, κ is the conic constant, and Cn is the nth-order aspheric coefficient.

The paraxial radius of curvature r of the aspheric surface is defined by the following formula:

$$r = 1/(2 \cdot C2 + 1/R)$$

In the data tables, an asterisk (*) indicates an aspheric surface, and paraxial radius of curvature is listed under the r column.

Furthermore, d0 in the tables of variable distance values indicates distance from the object-most surface of the lens system to the object.

DATA VALUES FOR EMBODIMENT 1
f 29.0–102.0
FNO 2.9
2ω 76.2°–23.3°

| Surface No. | Radius of Curvature | Distance Between Surfaces | Refractive Index | Abbe Number |
|---|---|---|---|---|
| 1 | 179.4636 | 2.5 | 1.860741 | 23.01 |
| 2 | 100.4072 | 8 | 1.612720 | 58.54 |
| 3 | 667.1932 | 0.1 | | |
| [Japanese original, page 12] | | | | |
| 4 | 66.1632 | 9.2 | 1.603001 | 65.42 |
| 5 | 239.6919 | d5 (variable) | | |
| *6 | 178.2769 | 1.7 | 1.796681 | 45.37 |
| 7 | 23.6895 | 8 | | |
| 8 | −64.1741 | 1.6 | 1.840421 | 43.35 |
| 9 | 20.7275 | 8 | 1.688930 | 31.08 |
| 10 | −70.0706 | 2 | | |
| 11 | −93.6222 | 3.5 | 1.740000 | 28.19 |
| 12 | −38.6957 | 4 | | |
| *13 | −21.9206 | 1.8 | 1.772789 | 49.45 |
| 14 | −572.4789 | 0.1 | | |
| 15 | 207.713 | 4 | 1.756920 | 31.62 |
| 16 | −76.0615 | d16 (variable) | | |
| 17 | ∞ | 0.8 | | (Aperture stop) |
| 18 | 89.1386 | 6.5 | 1.497820 | 82.52 |
| 19 | −69.8525 | 0.1 | | |
| 20 | 522.1863 | 4.2 | 1.497820 | 82.52 |
| 21 | −88.2673 | 0.1 | | |
| 22 | 172.0845 | 4.6 | 1.497820 | 82.52 |
| 23 | −98.2821 | 3.3 | | |
| 24 | −39.3269 | 1.8 | 1.860741 | 23.01 |
| 25 | −59.0789 | d25 (variable) | | |
| 26 | 45.0337 | 6 | 1.651599 | 58.5 |
| 27 | 819.5046 | 0.8 | | |
| 28 | −382.3683 | 1.8 | 1.796681 | 45.37 |
| 29 | 32.579 | 12 | 1.516800 | 64.1 |
| [Japanese original, page 13] | | | | |
| 30 | −48.4227 | 0.1 | | |
| 31 | −215.8507 | 5.35 | 1.603001 | 65.42 |
| 32 | −59.8844 | 5.55 | | |
| 33 | −36.326 | 1.8 | 1.840421 | 43.35 |
| 34 | 44.7735 | 2 | | |
| *35 | 51.7855 | 7 | 1.796681 | 45.37 |
| 36 | −66.6587 | Bf | | |

Surface No. 6, Surface No. 13, and Surface No. 35 are aspheric, the aspheric coefficients thereof being as indicated below.

| SURFACE NO. 6 | | |
|---|---|---|
| κ = −92.3715 | C2 = 0 | C3 = −1.2926 × 10⁻⁵ |
| | C4 = 7.2674 × 10⁻⁶ | C5 = 1.2339 × 10⁻⁸ |
| | C6 = −6.0988 × 10⁻⁹ | C7 = −9.7342 × 10⁻¹¹ |
| | C8 = 4.8570 × 10⁻¹² | C10 = 2.6005 × 10⁻¹⁴ |
| | C12 = −3.6977 × 10⁻¹⁷ | |
| SURFACE NO. 13 | | |
| κ = 1.0941 | C2 = 0 | |
| | C4 = 5.2556 × 10⁻⁶ | |
| | C6 = 4.4703 × 10⁻⁹ | |
| | C8 = 4.4116 × 10⁻¹¹ | |
| | C10 = 3.9015 × 10⁻¹⁴ | |
| SURFACE NO. 35 | | |
| κ = 2.4379 | C2 = 0 | C3 = −2.7011 × 10⁻⁷ |
| | C4 = −3.9029 × 10⁻⁶ | C5 = 7.9464 × 10⁻¹⁰ |
| | C6 = −2.4342 × 10⁻⁹ | C7 = 1.6713 × 10⁻¹¹ |
| | C8 = 1.5773 × 10⁻¹¹ | C10 = −2.4836 × 10⁻¹⁴ |
| | C12 = −1.2752 × 10⁻¹⁷ | |

TABLE OF VARIABLE DISTANCE VALUES:
FOCUSED ON SUBJECT AT INFINITE DISTANCE

| Focal Length | 29.0 | 50.0 | 102.0 |
|---|---|---|---|
| d0 | ∞ | ∞ | ∞ |
| [Japanese original, page 14] | | | |
| d5 | 0.71263 | 14.85796 | 45.49712 |
| d16 | 21.68347 | 8.58054 | 0.94922 |
| d25 | 11.62345 | 4.14840 | 5.62527 |
| Bf | 38.39966 | 61.08405 | 74.95217 |

TABLE OF VARIABLE DISTANCE VALUES:
FOCUSED ON SUBJECT AT INTERMEDIATE DISTANCE

| Magnification | −0.03333 | −0.03333 | −0.03333 |
|---|---|---|---|
| d0 | 814.6933 | 1416.4771 | 2839.5528 |
| d5 | 0.76123 | 14.85796 | 45.49712 |
| d16 | 22.60829 | 9.23510 | 1.83805 |
| d25 | 10.69863 | 3.49384 | 4.73644 |
| Bf | 38.39966 | 61.08405 | 74.95217 |

TABLE OF VARIABLE DISTANCE VALUES:
FOCUSED ON SUBJECT AT SHORT DISTANCE

| Magnification | −0.07954 | −0.10492 | −0.14066 |
|---|---|---|---|
| d0 | 309.2301 | 393.027 | 504.6742 |
| d5 | 0.76123 | 14.85796 | 45.49712 |
| d16 | 23.91591 | 10.64842 | 4.70864 |
| d25 | 9.39101 | 2.08052 | 1.86585 |
| Bf | 38.39966 | 61.08404 | 74.95219 |

APERTURE STOP DIAMETER

| Focal Length | 29.0 | 50.0 | 102.0 |
|---|---|---|---|
| Aperture Stop Diameter | 25.2 | 30.4 | 34.7 |

VALUES CORRESPONDING TO CONDITIONAL EXPRESSIONS

| (1) | n4 − n5 = | 0.01587 |
|---|---|---|
| (2) | Φ5/|ΦII| = | 0.2567 |
| (3) | (rb + ra)/(rb − ra) = | −0.4639 |
| [Japanese original, page 15] | | |
| (4) | Φ3 − 4/ΦII = | 0.2552 |
| (5) | (n3 + n5)/2 = | 1.748 |
| (6) | nN − nP = | 0.1515 |

Figure 2:
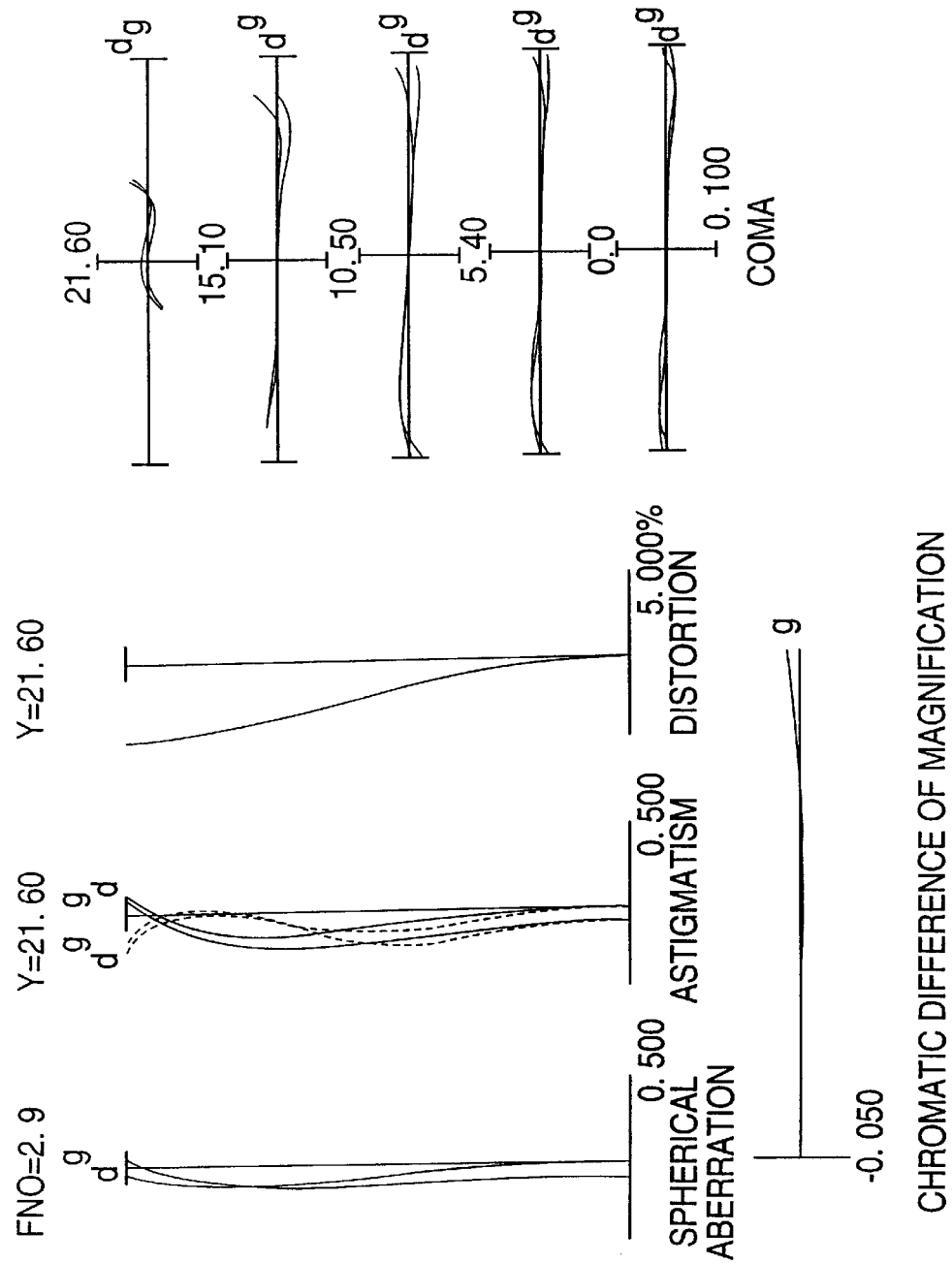
FIG. 2 [contains] aberration curves for Embodiment 1 at the wide-angle end and focused [on a subject] at an infinite distance.

FIG. 2 shows aberration curves for Embodiment 1 at the wide-angle end and focused [on a subject] at an infinite distance. From these, it is clear that Embodiment 1 displays satisfactory correction of aberration to a field angle as wide as 76.2°.

Figure 3:
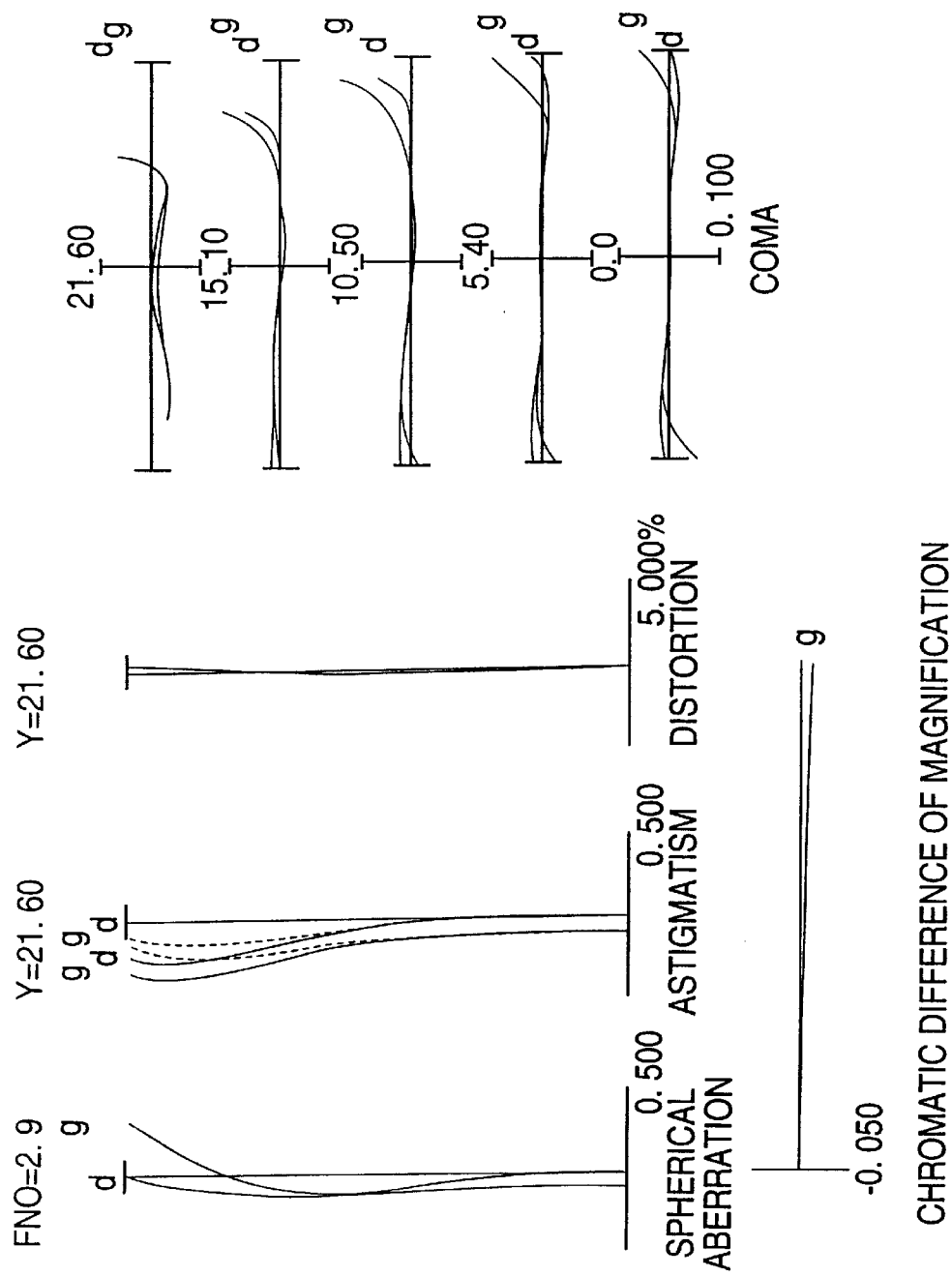
FIG. 3 [contains] aberration curves for Embodiment 1 when at an intermediate focal length and focused [on a subject] at an infinite distance.

Furthermore, FIG. 3 shows aberration curves for Embodiment 1 when at an intermediate focal length and focused [on a subject] at an infinite distance. From these, it is clear that, as at the wide-angle end, Embodiment 1 displays satisfactory correction of aberration when at an intermediate focal length as well.

Figure 4:
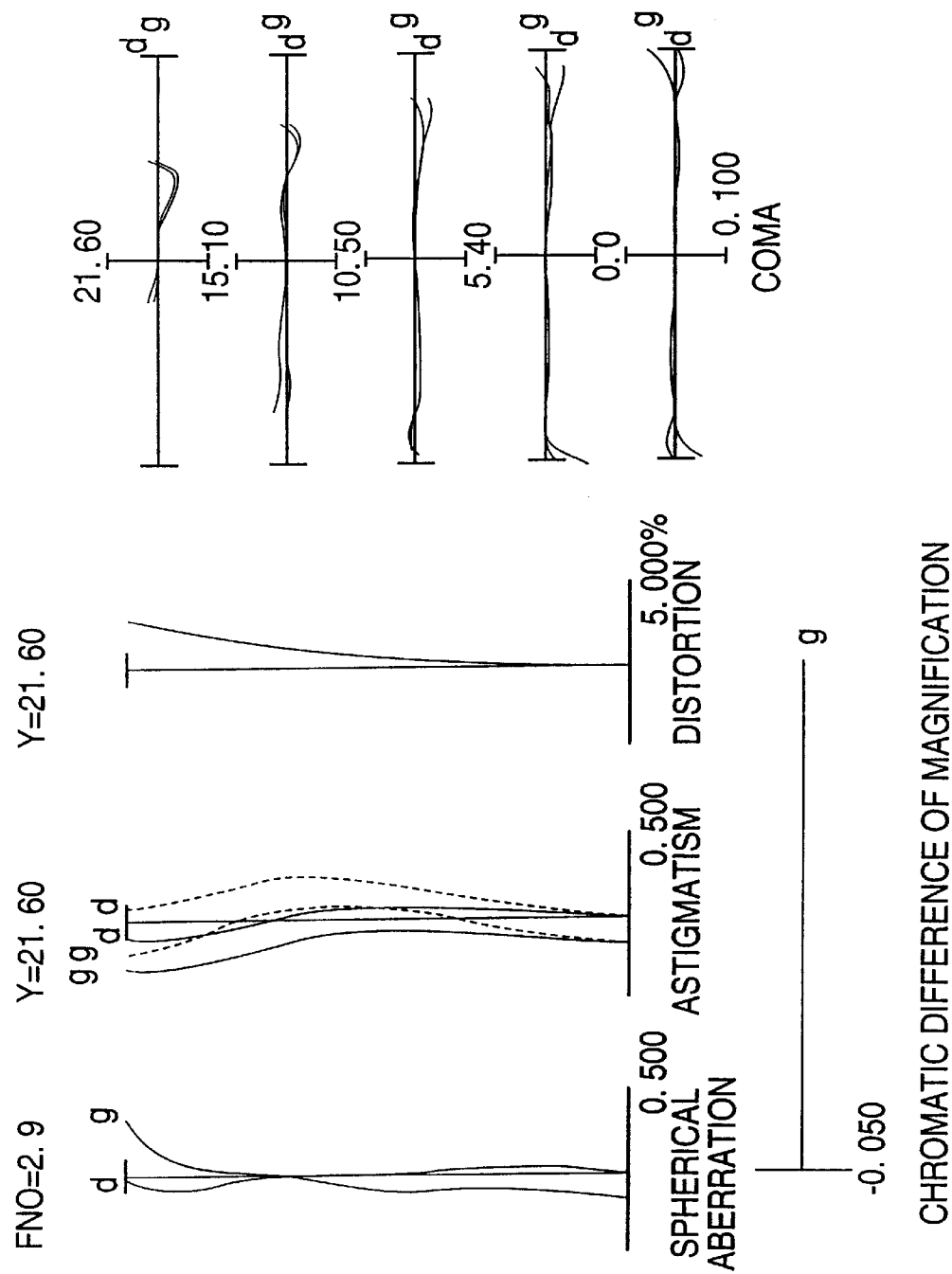
FIG. 4 [contains] aberration curves for Embodiment 1 at the telephoto end and focused [on a subject] at an infinite distance.

Moreover, FIG. 4 shows aberration curves for Embodiment 1 at the telephoto end and focused [on a subject] at an infinite distance. From these, it is clear that, as at the wide-angle end, Embodiment 1 displays satisfactory correction of aberration when at the telephoto end as well.

Note that in the aberration curves, F NO indicates F-number, A indicates field half-angle, and d and g respectively indicate aberration curves at the d line and g line. Furthermore, at the astigmatism curves, a solid line indicates the sagittal image plane and a broken line indicates the meridional image plane.

Embodiment 2

Figure 5:
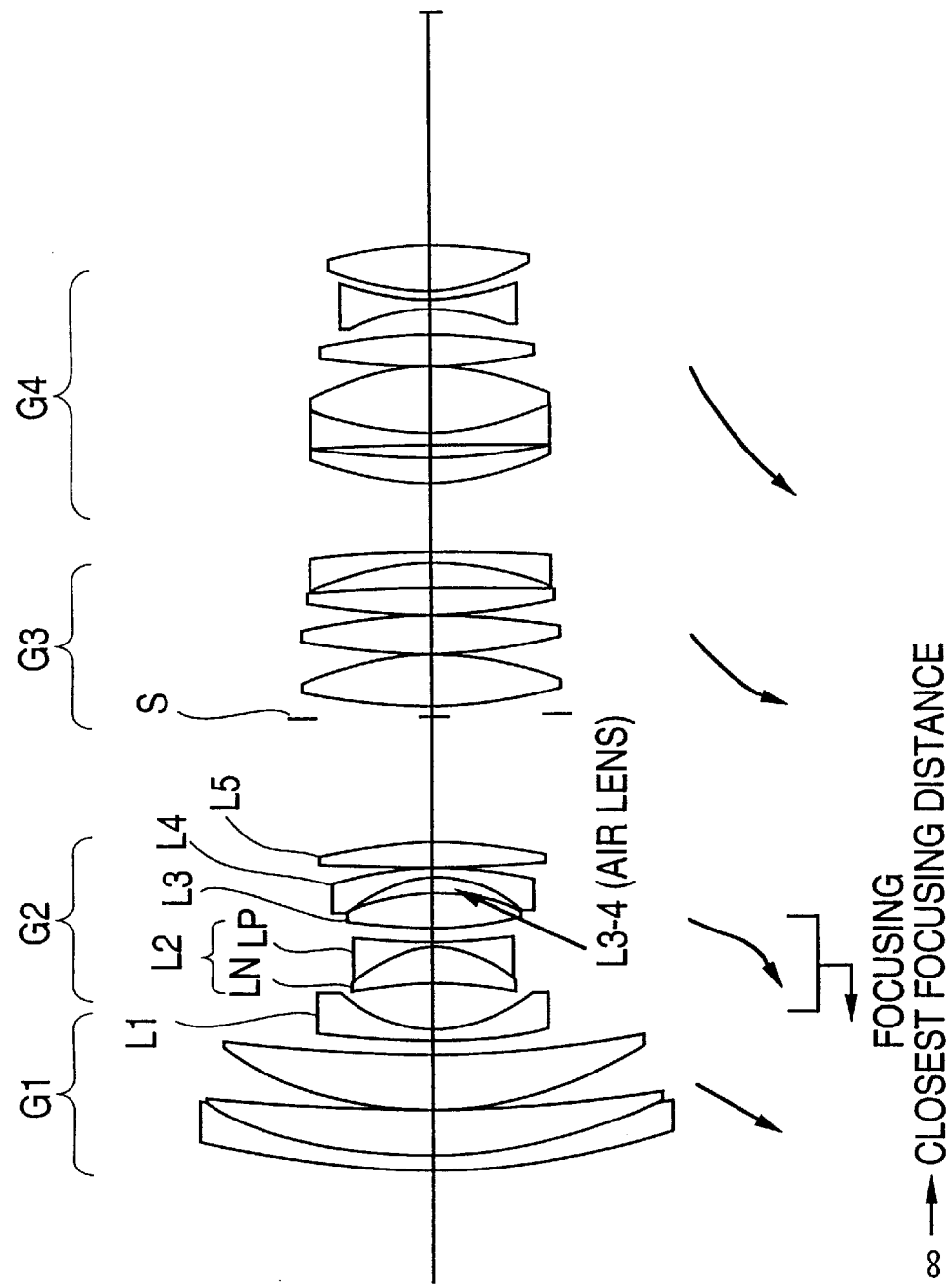
FIG. 5 is a drawing showing the constitution and locus of movement in Embodiment 2.

FIG. 5 shows the constitution and locus of movement in Embodiment 2.

Embodiment 2 employs a four-group constitution wherein there are, in order from the object side thereof, a first lens group G1 having positive refractive power, a second lens group G2 having negative refractive power, a third lens group G3 having positive refractive power, and a fourth lens group G4 having positive refractive power.

The first lens group G1 consists of, from the object side thereof, a cemented positive lens comprising a negative meniscus lens presenting a convex surface toward the object side and a positive meniscus lens that have been cemented together, and a positive meniscus lens presenting a convex surface toward the object side.

The second lens group G2 consists of, from the object side thereof, an aspheric negative meniscus lens L1 presenting a convex surface toward the object side and having an aspheric surface at the object side thereof, a cemented negative lens L2 presenting a concave surface toward the object side and consisting of a positive meniscus lens LP presenting a concave surface toward the object side and a biconcave lens LN that have been cemented together, a biconvex lens L3, a negative meniscus lens L4 presenting a concave surface toward the object side, and a biconvex lens L5.

Furthermore, an aperture stop S is installed immediately in front of the third lens group G3, and the third lens group G3 consists of a biconvex lens having an aspheric surface at the object side thereof, a biconvex lens, a positive meniscus lens presenting a convex surface toward the object side, and a negative meniscus lens presenting a convex surface toward the image side.

The fourth lens group G4 consists of a positive meniscus lens presenting a convex surface toward the object side, a cemented positive lens comprising a biconcave lens and a biconvex lens that have been cemented together, a biconvex lens, a biconcave lens, and an aspheric biconvex lens having an aspheric surface at the object side thereof.

Zooming is accomplished such that in going from the wide-angle end toward the telephoto end, the several groups respectively move toward the object side in such fashion as to cause the airspace between the first lens group G1 and the second lens group G2 to grow larger, the airspace between the second lens group G2 and the third lens group G3 to grow smaller, and the airspace between the third lens group G3 and the fourth lens group G4 to first grow smaller and to thereafter grow somewhat larger.

Furthermore, [changing to] short-distance focusing is accomplished by moving the second lens group G2 toward the object. Moreover, it is possible to almost completely eliminate fluctuations in aberration resulting from [a change to] short-distance focusing if focusing is carried out by determining the amount of travel of the third lens group G3 that will just correct for fluctuation in curvature of field at each focal length and causing [the third lens group G3] to move toward the image by an amount corresponding thereto simultaneous with movement of the second lens group G2 toward the image [sic] during [the change to] short-distance focusing.

Data values for Embodiment 2 are presented below. All symbols appearing in the data tables have the same [meanings] as in the data tables at Embodiment 1.

DATA VALUES FOR EMBODIMENT 2
f 29.0–102.0
F NO 2.9
$2\omega$ 76.2°–23.3°

| Surface No. | Radius of Curvature | Distance Between Surfaces | Refractive Index | Abbe Number |
|---|---|---|---|---|
| 1 | 138.0338 | 2.5 | 1.860741 | 23.01 |
| 2 | 86.2829 | 8 | 1.603001 | 65.42 |
| 3 | 310.5821 | 0.1 | | |
| 4 | 62.6388 | 9 | 1.603001 | 65.42 |
| [Japanese original, page 17] | | | | |
| 5 | 204.3354 | d5 (variable) | | |
| *6 | −3985.3887 | 1.7 | 1.796681 | 45.37 |
| 7 | 20.5519 | 8 | | |
| 8 | −60.718 | 5 | 1.648311 | 33.75 |
| 9 | −21.3495 | 1.6 | 1.840421 | 43.35 |
| 10 | 118.2802 | 2 | | |
| 11 | 128.4049 | 5.5 | 1.730378 | 25.48 |
| 12 | −36.6183 | 2.7 | | |
| 13 | −21.7271 | 1.8 | 1.772789 | 49.45 |
| 14 | −56.8882 | 0.1 | | |
| 15 | 509.6681 | 3.8 | 1.603420 | 38.03 |
| 16 | −81.5241 | d16 (variable) | | |
| 17 | ∞ | 1.5 | | (Aperture stop) |
| *18 | 75.1277 | 9 | 1.497820 | 82.52 |
| 19 | −51.5709 | 0.1 | | |
| 20 | 100.4141 | 6 | 1.497820 | 82.52 |
| 21 | −116.7426 | 0.1 | | |
| 22 | 89.3601 | 4.5 | 1.487490 | 70.41 |
| 23 | 1946.9335 | 4 | | |
| 24 | −52.3935 | 1.8 | 1.846660 | 23.82 |
| 25 | −295.4965 | d25 (variable) | | |
| 26 | 53.3123 | 4 | 1.516800 | 64.1 |
| 27 | 149.8967 | 2 | | |
| 28 | −408.5247 | 1.8 | 1.796681 | 45.37 |
| 29 | 42.1073 | 11 | 1.617200 | 54.01 |
| 30 | −44.0017 | 0.1 | | |
| [Japanese original, page 18] | | | | |
| 31 | 93.5211 | 5.5 | 1.575010 | 41.42 |
| 32 | −73.0627 | 3.76 | | |
| 33 | −39.4609 | 1.8 | 1.840421 | 43.35 |
| 34 | 39.4398 | 1.56 | | |
| *35 | 37.6363 | 7 | 1.516800 | 64.1 |
| 36 | −78.0973 | Bf | | |

Surface No. 6, Surface No. 18, and Surface No. 35 are aspheric, the aspheric coefficients thereof being as indicated below.

SURFACE NO. 6

$\kappa = 1000$
$C2 = 0$
$C3 = -4.7493 \times 10^{-6}$
$C4 = 1.1274 \times 10^{-5}$
$C5 = -9.0459 \times 10^{-8}$
$C6 = -7.5539 \times 10^{-9}$
$C7 = -1.5099 \times 10^{-11}$
$C8 = 1.0870 \times 10^{-11}$
$C10 = 1.4277 \times 10^{-14}$
$C12 = -1.6698 \times 10^{-17}$

SURFACE NO. [18]

$\kappa = -2.0877$
$C2 = 0$
$C4 = -3.5033 \times 10^{-7}$
$C6 = -5.9962 \times 10^{-10}$
$C8 = 5.6262 \times 10^{-13}$
$C10 = -2.0998 \times 10^{-15}$

SURFACE NO. 35

$\kappa = 4.2672$
$C2 = 0$
$C4 = -1.1752 \times 10^{-5}$
$C6 = -2.5755 \times 10^{-8}$
$C8 = 6.7913 \times 10^{-11}$
$C10 = -3.5993 \times 10^{-13}$

TABLE OF VARIABLE DISTANCE VALUES:
FOCUSED ON SUBJECT AT INFINITE DISTANCE

| Focal Length | 29.0 | 50.0 | 102.0 |
|---|---|---|---|
| d0 | ∞ | ∞ | ∞ |
| d5 | 2.73032 | 17.82507 | 47.26391 |
| [Japanese original, page 19] | | | |
| d16 | 21.66578 | 8.84055 | 0.86957 |
| d25 | 11.66079 | 4.35968 | 5.30237 |
| Bf | 37.99569 | 59.79923 | 74.92599 |

TABLE OF VARIABLE DISTANCE VALUES:
FOCUSED ON SUBJECT AT INTERMEDIATE DISTANCE

| Magnification | −0.03333 | −0.03333 | −0.03333 |
|---|---|---|---|
| d0 | 815.5074 | 1405.3798 | 2783.5489 |
| d5 | 1.91335 | 17.12666 | 46.22722 |
| d16 | 22.48275 | 9.53896 | 1.90626 |
| d25 | 11.66079 | 4.35968 | 5.30237 |
| Bf | 37.99569 | 59.79922 | 74.926 |

TABLE OF VARIABLE DISTANCE VALUES:
FOCUSED ON SUBJECT AT SHORT DISTANCE

| Magnification | −0.08036 | −0.13138 | −0.20951 |
|---|---|---|---|
| d0 | 308.6274 | 291.8555 | 254.3182 |
| d5 | 0.78592 | 15.14723 | 41.46521 |
| d16 | 23.61018 | 11.51839 | 6.66827 |
| d25 | 11.66079 | 4.35968 | 5.30237 |
| Bf | 37.9957 | 59.79924 | 74.926 |

APERTURE STOP DIAMETER

| Focal Length | 29.0 | 50.0 | 102.0 |
|---|---|---|---|
| Aperture Stop Diameter | 26.8 | 32.8 | 37.9 |

VALUES CORRESPONDING TO CONDITIONAL EXPRESSIONS

| (1) | $n4 - n5 =$ | 0.1694 |
|---|---|---|
| (2) | $\Phi5/|\Phi II| =$ | 0.1627 |
| (3) | $(rb + ra)/(rb - ra) =$ | −0.7242 |
| (4) | $\Phi3 - 4/\Phi II =$ | 0.2604 |
| [Japanese original, page 20] | | |
| (5) | $(n3 + n5)/2 =$ | 1.667 |
| (6) | $nN - nP =$ | 0.1921 |

Figure 6:
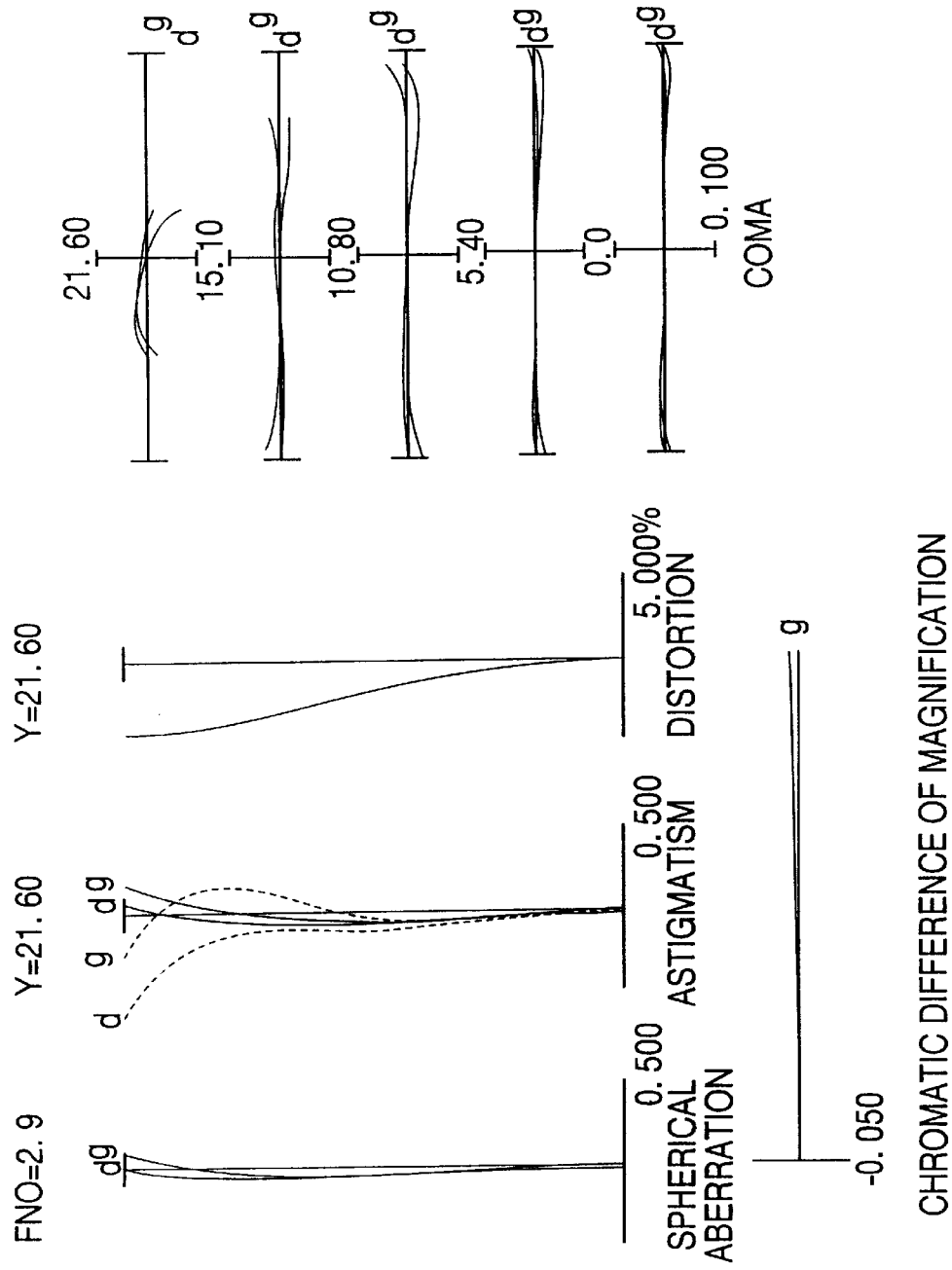
FIG. 6 [contains] aberration curves for Embodiment 2 at the wide-angle end and focused [on a subject] at an infinite distance.

FIG. 6 shows aberration curves for Embodiment 2 at the wide-angle end and focused [on a subject] at an infinite distance. From these, it is clear that Embodiment 2 displays satisfactory correction of aberration to a field angle as wide as 76.2°.

Figure 7:
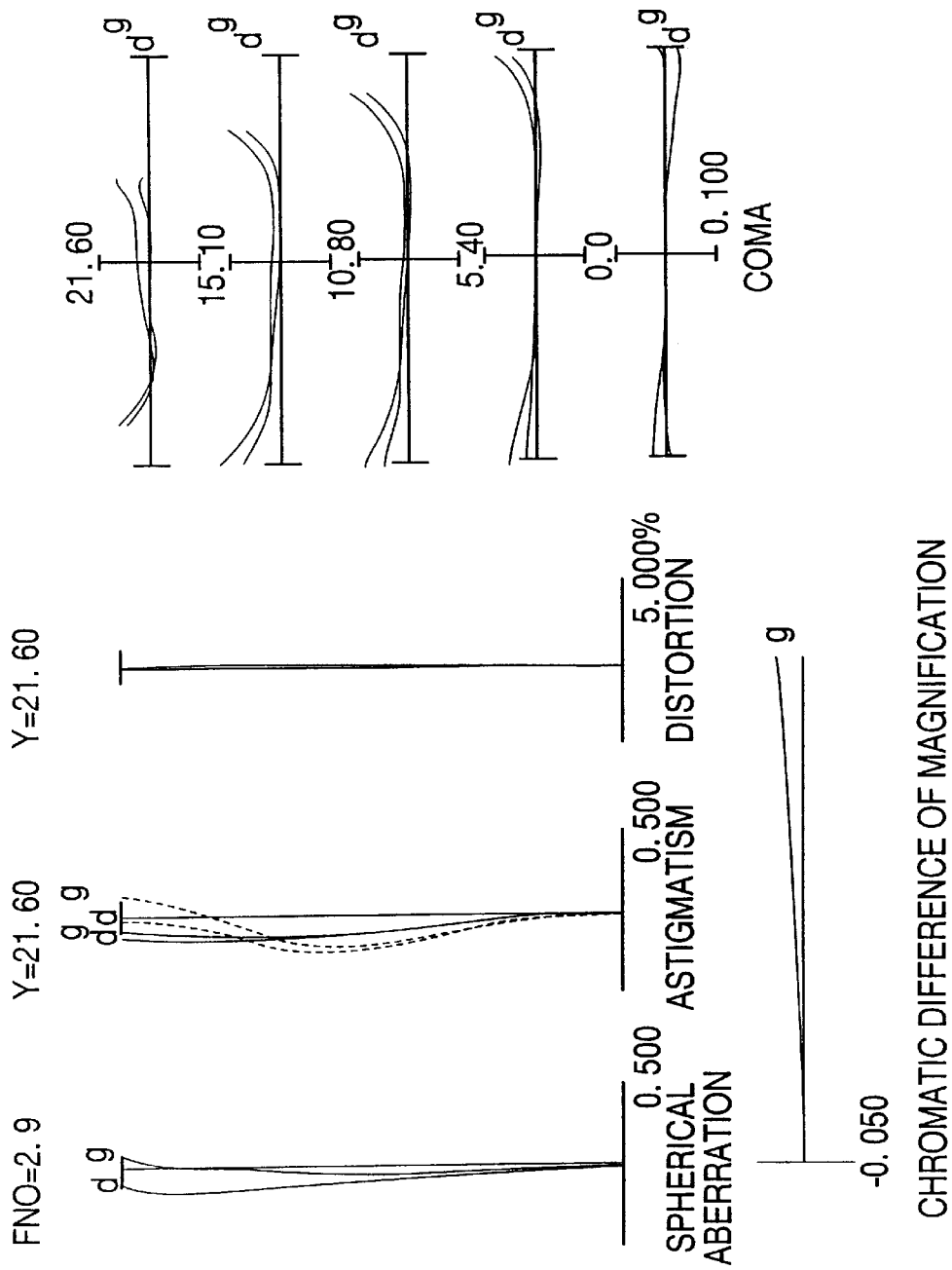
FIG. 7 [contains] aberration curves for Embodiment 2 when at an intermediate focal length and focused [on a subject] at an infinite distance.

Furthermore, FIG. 7 shows aberration curves for Embodiment 2 when at an intermediate focal length and focused [on a subject] at an infinite distance. From these, it is clear that, as at the wide-angle end, Embodiment 2 displays satisfactory correction of aberration when at an intermediate focal length as well.

Figure 8:
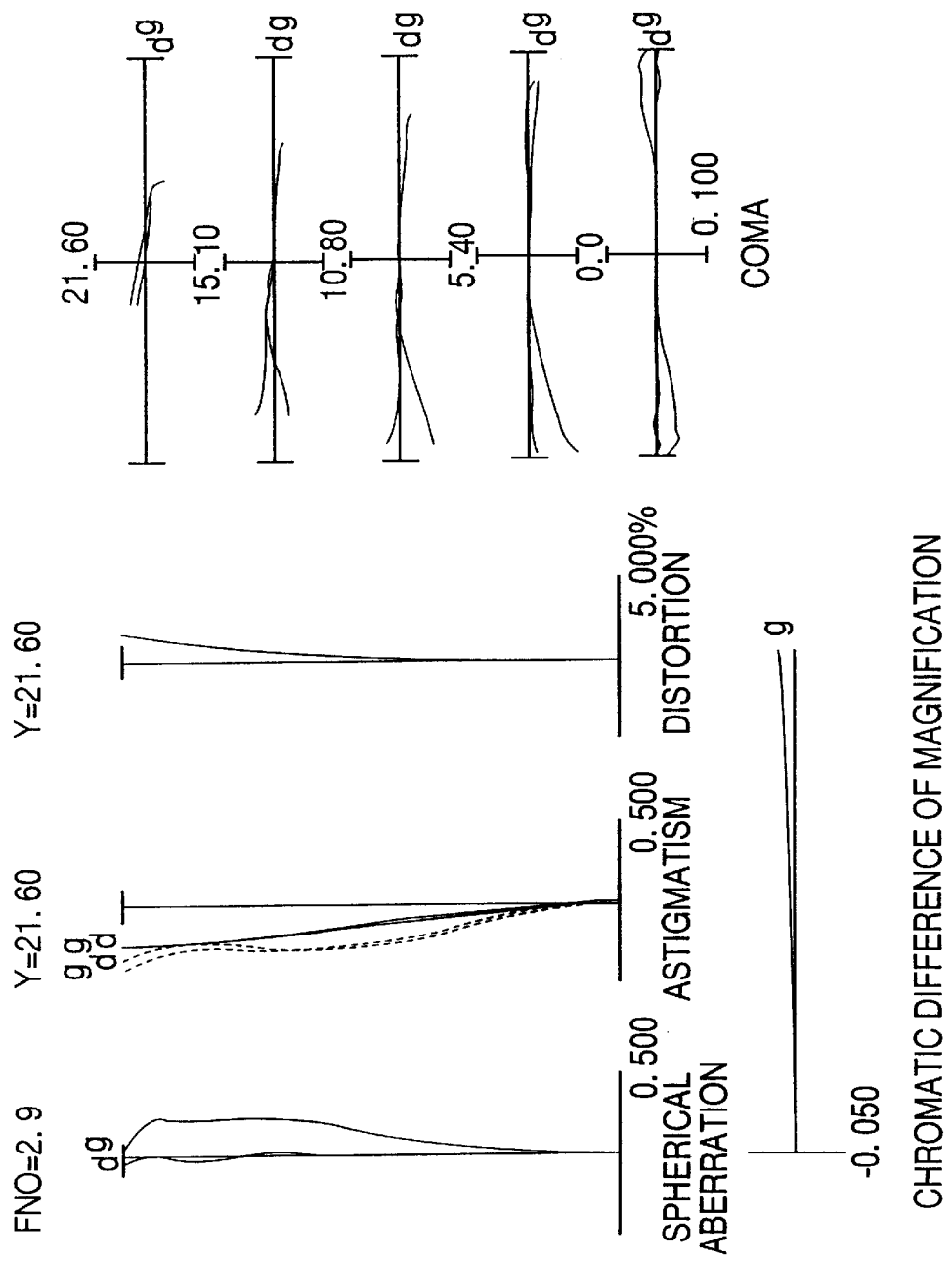
FIG. 8 [contains] aberration curves for Embodiment 2 at the telephoto end and focused [on a subject] at an infinite distance.

Moreover, FIG. 8 shows aberration curves for Embodiment 2 at the telephoto end and focused [on a subject] at an infinite distance. From these, it is clear that, as at the wide-angle end, Embodiment 2 displays satisfactory correction of aberration when at the telephoto end as well.

Note that in the aberration curves, F NO indicates F-number, A indicates field half-angle, and d and g respectively indicate aberration curves at the d line and g line. Furthermore, at the astigmatism curves, a solid line indicates the sagittal image plane and a broken line indicates the meridional image plane.

What is claimed is:

1. A zoom lens having in order from the object side thereof, a first lens group G1 having positive refractive power;

a second lens group G2 having negative refractive power;

and, at the image side thereof, one or more lens groups comprising a third lens group G3;

wherein an airspace between the aforesaid first lens group G1 and the aforesaid second lens group G2 changes during a change in magnification;

wherein the aforesaid second lens group G2 has five lens components, separated by air spaces, said five lens components being in order from the object side thereof: a negative lens component L1 comprising a negative lens presenting a concave surface toward the image side, a negative lens component L2 presenting a concave surface toward the object side, a positive lens component L3, a negative lens component L4, and a positive lens component L5;

and wherein the following conditional expression (1) is satisfied:

$$0<n4-n5<0.4, \quad (1)$$

where:

n4=Refractive index at the d line of a negative lens within the aforesaid negative lens component L4, and n5=Refractive index at the d line of a positive lens within the aforesaid positive lens component L5.

2. A zoom lens according to claim 1 wherein the following conditional expression (2) is satisfied:

$$0.06<\Phi 5/|\Phi II|<0.5, \quad (2)$$

where:

ΦII=Overall refractive power of the aforesaid second lens group G2, and

Φ5=Refractive power of the aforesaid positive lens component L5 within the second lens group G2.

3. A zoom lens according to claim 2 wherein the following conditional expression (3) is satisfied:

$$-5<(rb+ra)/(rb-ra)<0.5, \quad (3)$$

where:

ra=Radius of curvature of the object-side surface of the aforesaid positive lens component L5 within the second lens group G2, and rb=Radius of curvature of the image-side surface of the aforesaid positive lens component L5.

4. A zoom lens according to claim 3 wherein the following conditional expression (4) is satisfied:

$$0.05<\Phi 3\text{-}4/\Phi II<0.5, \quad (4)$$

where:

Φ3-4=Refractive power of an air lens L3-4 formed by an airspace between the aforesaid positive lens component L3 within the second lens group G2 and the aforesaid negative lens component L4 within the second lens group, and ΦII=Overall refractive power of the aforesaid second lens group G2.

5. A zoom lens according to claim 4 wherein an air lens L3-4 formed by an airspace between the positive lens component L3 and the negative lens component L4 within the aforesaid second lens group G2 is in the shape of a positive meniscus presenting a convex surface toward the image side.

6. A zoom lens according to claim 5 wherein the aforesaid negative lens component L4 within the second lens group G2 is in the shape of a negative meniscus presenting a convex surface toward the image side.

7. A zoom lens according to claim 6 wherein the following conditional expression (5) is satisfied:

$$1.5<(n3+n5)/2<1.8, \quad (5)$$

where:

n3=Refractive index at the d line of a positive lens comprised by the aforesaid positive lens component L3 within the second lens group G2, and n5=Refractive index at the d line of a positive lens comprised by the aforesaid positive lens component L5 within the second lens group G2.

8. A zoom lens according to claim 7 wherein the aforesaid negative lens component L2 within the second lens group G2 has at least one cemented negative lens comprising a positive lens LP and a negative lens LN that have been cemented together;

and wherein the following conditional expressions is satisfied:

$$0.05<nN-nP<0.3, \quad (6)$$

where:

nP=Refractive index at the d line of a positive lens LP comprised by the aforesaid cemented negative lens, and nN=Refractive index at the d line of a negative lens LN comprised by the aforesaid cemented negative lens.

9. A zoom lens according to claim 8 wherein a negative lens comprised by the aforesaid negative lens component L4 within the second lens g group G2 is in a shape presenting a concave surface toward the object side, and the aforesaid object-side concave surface is aspheric in shape such that curvature grows weaker as one goes from the center to the periphery thereof.

10. A zoom lens according to claim 9 wherein
during focusing from the infinite-distance side to an object point at a short distance, focusing is accomplished as a result of movement of the aforesaid second lens group G2 toward the object; or focusing is accomplished as a result of movement of the aforesaid third lens group G3 toward the image plane; or focusing is accomplished as a result of combination of both movement of the aforesaid second lens group G2 toward the object simultaneous with movement of the aforesaid third lens group G3 toward the image plane.

11. A zoom lens according to claim 1 characterized in that the following conditional expression (3) is satisfied:

$$-5<(rb+ra)/(rb-ra)<0.5, \qquad (3)$$

where:
ra=Radius of curvature of the object-side surface of the aforesaid positive lens component L5 within the second lens group G2, and
rb=Radius of curvature of the image-side surface of the aforesaid positive lens component L5.

12. A zoom lens according to claim 1 wherein the following conditional expression (4) is satisfied:

$$0.05<\Phi 3\text{-}4/\Phi II<0.5, \qquad (4)$$

where:
$\Phi 3\text{-}4$=Refractive power of an air lens L3-4 formed by an airspace between the aforesaid positive lens component L3 within the second lens group G2 and the aforesaid negative lens component L4 within the second lens group, and
$\Phi II$=Overall refractive power of the aforesaid second lens group G2.

13. A zoom lens according to claim 1 wherein
an air lens L3-4 formed by an airspace between the positive lens component L3 and the negative lens component L4 within the aforesaid second lens group G2 is in the shape of a positive meniscus presenting a convex surface toward the image side.

14. A zoom lens according to claim 13 wherein
the aforesaid negative lens component L4 within the second lens group G2 is in the shape of a negative meniscus presenting a convex surface toward the image side.

15. A zoom lens according to claim 1 wherein
the aforesaid negative lens component L4 within the second lens group G2 is in the shape of a negative meniscus presenting a convex surface toward the image side.

16. A zoom lens having, in order from the object side thereof,
a first lens group G1 having positive refractive power;
a second lens group G2 having negative refractive power;
and, at the image side thereof, one or more lens groups comprising a third lens group G3;
wherein an airspace between the aforesaid first lens group G1 and the aforesaid second lens group G2 changes during a change in magnification;
wherein the aforesaid second lens group G2 has, in order from the object side thereof, the following air-spaced components: a negative lens component L1 comprising a negative lens presenting a concave surface toward the image side, a negative lens component L2 presenting a concave surface toward the object side, a positive lens component L3, a negative lens component L4, and a positive lens component L5;
wherein, during focusing from the infinite-distance side to an object point at a short distance, focusing is accomplished as a result of movement of the aforesaid second lens group G2 toward the object; or focusing is accomplished as a result of movement of the aforesaid third lens group G3 toward the image plane; or focusing is accomplished as a result of combination of both movement of the aforesaid second lens group G2 toward the object simultaneous s with movement of the aforesaid third lens group G3 toward the image plane, and wherein the following conditional expression (1) is satisfied:

$$0<n4-n5<0.4, \qquad (1)$$

where:
n4=Refractive index at the d line of a negative lens within the aforesaid negative lens component L4, and
n5=Refractive index at the d line of a positive lens within the aforesaid positive lens component L5.

17. A zoom lens according to claim 16 wherein the following conditional expression (3) is satisfied:

$$-5<(rb+ra)/(rb-ra)<0.5, \qquad (3)$$

where:
ra=Radius of curvature of the object-side surface of the aforesaid positive lens component L5 within the second lens group G2, and
rb=Radius of curvature of the image-side surface of the aforesaid positive lens component L5.

18. A zoom lens according to claim 16 wherein the following conditional expression (2) is satisfied:

$$0.06<\Phi 5/|\Phi II|<0.5, \qquad (2)$$

where:
$\Phi II$ Overall refractive power of the aforesaid second lens group G2, and
$\Phi 5$=Refractive power of the aforesaid positive lens component L5 within the second lens group G2.

19. A zoom lens according to claim 1 wherein
the aforesaid negative lens component L4 within the second lens group G2 is in the shape of a negative meniscus presenting a convex surface toward the image side.

20. A zoom lens having, in order from the object side thereof,
a first lens group G1 having positive refractive power;
a second lens group G2 having negative refractive power;
and, the image side thereof, one or more lens groups comprising a third lens group G3;
wherein an airspace between the aforesaid first lens group G1 and the aforesaid second lens group G2 changes during a change in magnification;
wherein the aforesaid second lens group G2 has, in order from the object side thereof, the following air-spaced components: a negative lens component L1 comprising a negative lens presenting a concave surface toward the image side, a negative lens component L2 presenting a concave surface toward the object side, a positive lens component L3, a negative lens component L4, and a positive lens component L5;

wherein an air lens L3-4 formed by an airspace between the positive lens component L3 and the negative lens component L4 within the aforesaid second lens group G2 is in the shape of a positive meniscus presenting a convex surface toward the image side;

wherein the aforesaid negative lens component L4 within the second lens group G2 is in the shape of a negative meniscus presenting a convex surface toward the image side;

and wherein the following conditional expression (1) is satisfied:

$$0 < n4 - n5 < 0.4, \quad (1)$$

where:

n4=Refractive index at the d line of a negative lens within the aforesaid negative lens component L4, and n5=Refractive index at the d line of a positive lens within the aforesaid positive lens component L5.

* * * * *